(12) United States Patent
Gutmann et al.

(10) Patent No.: US 11,142,625 B2
(45) Date of Patent: Oct. 12, 2021

(54) PROCESS FOR PRODUCTION OF EXPANDED THERMOPLASTIC ELASTOMER

(71) Applicant: BASF SE, Ludwigshafen (DE)

(72) Inventors: Peter Gutmann, Karlsruhe (DE); Christian Däschlein, Mannheim (DE); Jürgen Ahlers, Groß-Rohrheim (DE); Elke Marten, Ostercappeln (DE); Torben Kaminsky, Lemförde (DE); Dirk Kempfert, Stemwede-Dielingen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/029,686

(22) PCT Filed: Oct. 17, 2014

(86) PCT No.: PCT/EP2014/072309
§ 371 (c)(1),
(2) Date: Apr. 15, 2016

(87) PCT Pub. No.: WO2015/055811
PCT Pub. Date: Apr. 23, 2015

(65) Prior Publication Data
US 2016/0244587 A1    Aug. 25, 2016

(30) Foreign Application Priority Data

Oct. 18, 2013 (EP) .................................... 13189353

(51) Int. Cl.
*C08J 9/34* (2006.01)
*C08J 9/12* (2006.01)
*C08J 9/14* (2006.01)
*B29C 44/34* (2006.01)
*C08J 9/00* (2006.01)
*C08J 9/16* (2006.01)
(Continued)

(52) U.S. Cl.
CPC ................. *C08J 9/34* (2013.01); *B29B 7/88* (2013.01); *B29B 9/12* (2013.01); *B29C 44/3461* (2013.01); *C08G 18/6674* (2013.01); *C08G 18/7671* (2013.01); *C08J 9/0066* (2013.01); *C08J 9/122* (2013.01); *C08J 9/127* (2013.01); *C08J 9/141* (2013.01); *C08J 9/144* (2013.01); *C08J 9/149* (2013.01); *C08J 9/16* (2013.01); *B29B 9/065* (2013.01); *C08G 2110/0033* (2021.01); *C08G 2110/0058* (2021.01); *C08J 2201/03* (2013.01); *C08J 2203/06* (2013.01); *C08J 2203/14* (2013.01); *C08J 2203/142* (2013.01); *C08J 2203/182* (2013.01); *C08J 2300/22* (2013.01); *C08J 2300/26* (2013.01); *C08J 2375/06* (2013.01); *C08J 2375/08* (2013.01)

(58) Field of Classification Search
CPC ............ C08G 18/6674; C08G 18/7671; C08G 2101/0033; C08G 2101/0058; C08G 18/2101; C08G 18/0033; C08G 18/0058; C08J 9/0066; C08J 9/122; C08J 9/127; C08J 9/141; C08J 9/144; C08J 9/149; C08J 9/16; C08J 9/34; C08J 2201/03; C08J 2203/06; C08J 2203/14; C08J 2203/142; C08J 2203/182; C08J 2300/22; C08J 2300/26; C08J 2375/06; C08J 2375/08; C08J 2201/2203; C08J 2201/06; C08J 2201/14; C08J 2201/142; C08J 2201/182; B29L 39/065; B29L 39/12; B29B 7/88; B29B 9/065; B29B 9/12; B29C 44/3461
See application file for complete search history.

(56) References Cited

U.S. PATENT DOCUMENTS 3,310,617 A    3/1967    Dygert et al.
3,642,964 A    2/1972    Rausch, Jr. et al.
(Continued)

FOREIGN PATENT DOCUMENTS

CN    1272855 A    11/2000
CN    1678670 A    10/2005
(Continued)

OTHER PUBLICATIONS

International Search Report for PCT/EP2014/072309 dated Nov. 25, 2014.
(Continued)

*Primary Examiner* — John M Cooney
(74) *Attorney, Agent, or Firm* — Faegre Drinker Biddle & Reath LLP

(57) ABSTRACT

The invention relates to a process for production of expanded thermoplastic elastomer, said process comprising the steps of:

(e) adding monomers and/or oligomers used for producing the thermoplastic elastomer with or without further starting materials into a first stage of a polymer-processing machine, (f) mixing the monomers and/or oligomers and also the optionally added further starting materials and reacting the monomers and/or oligomers to give a polymer melt in the first stage of the polymer-processing machine, (g) passing the polymer melt into a second stage of a polymer-processing machine and adding a physical blowing agent with or without further starting materials to obtain a polymer melt comprising a blowing agent, (h) molding the polymer melt comprising a blowing agent into an expanded thermoplastic elastomer.

10 Claims, No Drawings

(51) Int. Cl.
*B29B 7/88* (2006.01)
*B29B 9/12* (2006.01)
*C08G 18/66* (2006.01)
*C08G 18/76* (2006.01)
*B29B 9/06* (2006.01)

(56) References Cited

U.S. PATENT DOCUMENTS

| | | | |
|---|---|---|---|
| 3,673,126 A | | 6/1972 | Carmody et al. |
| 5,391,682 A | | 2/1995 | Ogawa et al. |
| 5,707,573 A | * | 1/1998 | Biesenberger ...... B29C 44/3446 264/50 |
| 6,391,931 B1 | * | 5/2002 | Gehlsen ................ B29C 44/348 521/134 |
| 6,624,278 B2 | | 9/2003 | Müller et al. |
| 6,783,710 B1 | | 8/2004 | Walder |
| 6,979,701 B2 | | 12/2005 | Kaneda et al. |
| 2002/0193459 A1 | | 12/2002 | Haseyama et al. |
| 2003/0139509 A1 | | 7/2003 | Onder |
| 2006/0167123 A1 | | 7/2006 | Dietzen et al. |
| 2009/0112723 A1 | | 4/2009 | Gottesman et al. |
| 2012/0329892 A1 | | 12/2012 | Prissok et al. |
| 2015/0174808 A1 | | 6/2015 | Rudolph et al. |

FOREIGN PATENT DOCUMENTS

| | | |
|---|---|---|
| CN | 101003646 A | 7/2007 |
| CN | 102276785 A | 12/2011 |
| CN | 103183805 A | 7/2013 |
| DE | 1 300 282 B | 7/1969 |
| DE | 100 56 251 A1 | 5/2002 |
| EP | 1 213 307 A1 | 6/2002 |
| EP | 2223290 A1 | 9/2010 |
| EP | 2565223 A1 | 3/2013 |
| JP | 2000327822 A | 11/2000 |
| JP | 2002347057 A | 12/2002 |
| WO | WO-9100304 A1 | 1/1991 |
| WO | WO-96/20966 A1 | 7/1996 |
| WO | WO-9916806 A1 | 4/1999 |
| WO | WO-0189794 A1 | 11/2001 |
| WO | WO-2007082838 A1 | 7/2007 |
| WO | WO-2011/005705 A2 | 1/2011 |
| WO | WO-2013153153 A1 | 10/2013 |

OTHER PUBLICATIONS

Ullmann's Enzyklopädie der Technischen Chemie. 4th ed. vol. 20, p. 415 ff.

"Polystyrene", Wikipedia, obtained from en.wikipedia.org/wiki/Polystyrene on Jun. 5, 2018, pp. 1-12.

Cheremisinioff, N., "Handbook of Polymer Science and Technology—Composites and Speciality Applications", 1989, vol. 4, p. 184.

Szycher, M., "Szycher's Handbook of Polyurethanes", Second Edition, 2013, Chapter 29, pp. 873-896.

Zhong, H., et al., "Integrated process of supercritical $CO_2$-assisted melt polycondensation modification and foaming of poly(ethylene terephthalate)", J. of Supercritical Fluids, 2013, vol. 74, pp. 70-79.

* cited by examiner

PROCESS FOR PRODUCTION OF EXPANDED THERMOPLASTIC ELASTOMER

CROSS-REFERENCE TO RELATED APPLICATIONS

This application is a national stage application (under 35 U.S.C. § 371) of PCT/EP2014/072309, filed Oct. 17, 2014, which claims benefit of European Application No. 13189353.9, filed Oct. 18, 2013, both of which are incorporated herein by reference in their entirety.

The invention relates to a process for production of expanded thermoplastic elastomer, in particular expanded thermoplastic elastomer in pellet form. Thermoplastic polyurethanes are an example of thermoplastic elastomers used in the process.

Uses of expanded thermoplastic elastomers include, for example, the production of all kinds of solid foamed-material articles, for example for gymnastics mats, body protectors, trim elements in automotive construction, sound and vibration absorbers, packaging or shoe soles. The preferred procedure is to fill a mold with pellets of an expanded elastomer and to apply heat to melt the individual pellets incipiently at their surface and thereby fuse them together. Complicatedly shaped intermediate or finished moldings having undercuts can be produced in this way as well as simple ones.

Foamed materials, including in particular bead foams, are well known and have been extensively described in the literature, for example in Ullmann's "Enzyklopädie der technischen Chemie", 4th edition, volume 20, p. 416 ff.

WO-A 2007/082838 discloses a process for production of expanded, thermoplastic polyurethane comprising a blowing agent. A first step of the process comprises extruding a thermoplastic polyurethane into pellets. The pellets are impregnated with a blowing agent in an aqueous suspension under pressure in a second step and expanded in a third step. In a further embodiment of the process, the thermoplastic polyurethane is melted in an extruder together with a blowing agent and the melt is pelletized without a device to prevent foaming. The production of thermoplastic polyurethane and the further processing into an expanded thermoplastic polyurethane in the same machine are not described.

The production of thermoplastically processable polyurethane elastomers is known from EP-A 1 213 307 for example. The polyurethanes obtained by the process described therein are compact and are not used for the production of expanded elastomers.

WO-A 2011/005705 describes a process for producing foamed polyurethanes in an extruder. Monomers used for producing polyurethanes are introduced to a first section of the extruder and a blowing agent is admixed at a second position, following intervening devolatilization under vacuum pressure. The polymer melt then foams up in or at the downstream end of the extruder and the foamed material is extruded. Even tiny variations here in the manufacturing process can lead to differences in foam construction, so process control has to be very exacting if a homogeneous foam is to be obtained. The intermediate and finished articles obtained consist of crosslinked polyurethanes, which subsequently are impossible to further process by thermoforming or other thermal treatment. Therefore, the intermediate or finished articles desired have to be molded in the ultimate, final shape. Complicatedly shaped geometries with undercuts cannot be realized.

The production of expandable thermoplastic polyurethane pellet material is known from DE-A 1 300 282. However, further processing requires renewed melting, for example in an extruder, in which case foaming generally already takes place in the extruder. Particularly the production of an expanded pellet material is not possible in this way.

WO-A 96/20966 describes a process wherein the polyurethane production components are mixed in an extruder, applied to a belt and foamed up and cured on the belt. DE-A 100 56 251 describes a further process for production of polyurethane foams wherein a step of curing the monomers to form the polyurethane takes place immediately on emergence from the extruder. WO-A 96/20966 and DE-A 100 56 251 both describe foams composed of thermoset polyurethanes. These are in principle impossible to further process in the mold like thermoplastic elastomers. Notably the polyurethane foams obtained in WO-A 96/20966 are very limited in terms of shape, since the belt process is merely capable of producing slabstock foam, which does not have defined contours. These materials cannot be molded directly into shaped articles, but need to be further processed into intermediate or final articles, for example by machining or cutting, in which case large amounts of scrap can be generated. Nor are the materials described in the two documents subsequently thermoformable, since the materials crosslink and thus can no longer be softened. As a result, direct molding of complicatedly shaped finished articles is not possible and the later production of complicatedly shaped finished articles from the materials is only possible at great expense and inconvenience and with the generation of cutting scrap. Beads in particular cannot be realized in either case.

It is an object of the present invention to provide a process for production of expanded expanded thermoplastic elastomer, in particular for production of an expanded pellet material of defined porosity.

This object is achieved by a process for production of expanded thermoplastic elastomer, said process comprising the steps of:
(a) adding monomers and/or oligomers used for producing the thermoplastic elastomer with or without further starting materials into a first stage of a polymer-processing machine,
(b) mixing the monomers and/or oligomers and also the optionally added further starting materials and reacting the monomers and/or oligomers to give a polymer melt in the first stage of the polymer-processing machine,
(c) passing the polymer melt into a second stage of the polymer-processing machine and adding a physical blowing agent with or without further starting materials to obtain a polymer melt comprising a blowing agent,
(d) molding the polymer melt comprising a blowing agent into an expanded thermoplastic elastomer.

The process of the present invention provides a way of obtaining a foamed intermediate article, for example an expanded pellet material, comprising an expanded thermoplastic elastomer directly, without further intervening steps, from the monomers and optionally further reactants or starting materials to be used. The process also provides huge scope for varying the foam structure. The expanded thermoplastic elastomer beads obtained according to the present invention are further processable into complicatedly shaped finished articles by molding, i.e., at no great cost or inconvenience and without generating cutting scrap.

Process conditions can be varied during the molding in step (d) to produce different porosities for the foam and an expanded thermoplastic elastomer having an uninterrupted skin. An uninterrupted skin can be desired for haptic reasons, for example. An uninterrupted skin can also be used to slow or even fully prevent the ingress of moisture into the foamed thermoplastic elastomer.

In accordance with the present invention besides the term "elastomer" also the term "polymer" is used, following general linguistic usage. Regarding the main component of the thermoplastic elastomer produced by the inventive process, the term "polymer" indicates the thermoplastic elastomer.

Useful polymer-processing machines can include in particular screw-plunger machines or melt pumps. Any other machine capable of production of polymers and subsequently of beads of the polymer can also be used. Screw-plunger machines are particularly preferred, however.

Extruders are preferably used as screw-plunger machines to carry out the process of the present invention. In general, as the degree of conversion of the monomers and/or oligomers increases, the viscosity in whichever apparatus is used also increases.

In one embodiment of the invention, steps (b) and (c) are carried out in one machine. In this case, the first stage is a first sector of the screw-plunger machine, the sector in which the conversion of the monomers and/or oligomers to the polymer takes place in the presence or absence of further starting materials, and the second stage is a second sector of the screw-plunger machine, the sector which is immediately downstream of the first sector and into which the physical blowing agent is fed. This apparatus is particularly suitable for the employment of extruders for pellet production.

Alternatively, it is also possible to employ a first screw-plunger machine to produce the polymer in step (b) and a second screw-plunger machine to feed the physical blowing agent in step (c), in which case there is coupling between the first and second screw-plunger machines such that the polymer melt obtained in the first screw-plunger machine transfers directly into the second screw-plunger machine. It is thus a polymer melt which is supplied to the second screw-plunger machine for performing step (c), obviating the otherwise necessary step of melting the polymer. An example of apt equipment for use here is a tandem extruder, wherein the first stage of the screw-plunger machine is a first extruder of the tandem extruder and the second stage of the screw-plunger machine is a second extruder of the tandem extruder.

In a particularly preferred embodiment, a twin-screw extruder is used as first stage of the screw-plunger machine. It is this twin-screw extruder which is fed with the monomers and/or oligomers used for producing the thermoplastic elastomer and also optionally further starting materials. It is in the twin-screw extruder that the monomers and/or oligomers are reacted to give the thermoplastic elastomer. The configuration of the first stage of the screw-plunger machine in this case is such that the residence time is sufficient to convert the monomers and/or oligomers used into the thermoplastic elastomer. This can be achieved, for example, by varying the length of the first stage, the rotary speed of the at least one screw in the screw-plunger machine and the flight depth of the screw. The geometric data of the first stage and the rotary speed of the at least one screw determine the residence time.

The second stage of the screw-plunger machine is where the physical blowing agent is subsequently added. To ensure uniform distribution of the physical blowing agent in the polymer melt, the second stage of the screw-plunger machine will include, for example, suitable mixing units on the screw. A static mixer can also be used here in addition.

A melt pump can also be used as an alternative to an extruder. To achieve uniform distribution of the physical blowing agent in the polymer, the melt pump is preferably followed by a static mixer upstream of entry into a pelletizing system.

The pellet material is typically produced by extruding the polymer melt into strands, which are subsequently cut into pellet material. Owing to its admixture with physical blowing agent, the polymer melt emerging from the extruder undergoes expansion due to the decrease in pressure to produce a foamed product, while pelletization thus produces an expanded pellet material.

In one preferred embodiment, the pellet material is obtained by forcing the polymer melt in step (d) through a temperature-regulated pelletizing die, using a cutting device to cut the polymer melt forced through the temperature-regulated pelletizing die into individual expanding pellets and using a stream of liquid to export the pellets from the pelletizing chamber. The temperature of the temperature-regulated pelletizing die in this embodiment is preferably between 150 and 280° C.

To prevent uncontrolled foaming of the polymer melt in the pelletizing chamber and to obtain a uniformly foamed pellet material, an above-ambient pressure is advantageously applied to the pelletizing chamber. It is further particularly preferable to flood the pelletizing chamber with a liquid, so the thermoplastic polymer melt comprising a blowing agent is pressed directly into a liquid. Water is preferably the liquid used in the pelletizing chamber.

To produce expanded pellets having an uninterrupted skin, a preferred embodiment provides that a temperature-regulated liquid flowing through the pelletizing chamber as a stream has a temperature in the range from 10 to 60° C. and a pressure in the range from 0.7 to 20 bar above ambient pressure, while the pressure and temperature for the liquid in the pelletizing chamber and also the temperature for the pelletizing die are chosen such that the pellets are expanded in the pressurized liquid by the physical blowing agent they contain so as to produce expanded pellets having an uninterrupted skin.

The necessary pelletization pressure at the pelletizing device in the polymer-processing machine and also the necessary temperature for the melt are dependent on the elastomer to be processed and also on the auxiliary materials used and on the physical blowing agent used. The necessary pressure and the necessary temperature are further dependent on the mixing ratio between the components in the elastomer.

In the pelletizing chamber, the polymer forced through the temperature-regulated pelletizing die is molded into strands which a cutting device comminutes into individual expanding pellets. The cutting device may be embodied as a fast-rotating blade, for example. The shape of the resulting pellets is dependent on the shape and size of the holes in the pelletizing die and also on the pressure with which the melt is forced through the holes in the pelletizing die and on the speed of the cutting device. It is preferable for the forcing pressure, the speed of the cutting device and the size of the holes in the pelletizing die to be chosen such that the shape of the pellets is substantially spherical. The relationships between the number of blades, the number of holes and rotary blade speed are known to a person skilled in the art.

The pellets are exported from the pelletizing chamber using, for example, the temperature-regulated liquid which flows through the pelletizing chamber. The choice of the pressure and the temperature for the temperature-regulated liquid is such that the polymer strands/pellets are expanded in controlled fashion by the physical blowing agent they contain to form an uninterrupted skin on the surface of the pellets.

The pellets flow together with the temperature-regulated liquid into, for example, a dryer where the pellets are separated from the liquid. The ready-produced, expanded pellets may be collected in a container, while the liquid is filtered and returned back into the pelletizing chamber via a pump.

Pelletization in a pressurized liquid where the temperature of the liquid is under control prevents the polymer melt comprising a blowing agent from undergoing an uncontrolled expansion in which no formation of an uninterrupted skin can take place. Such beads would initially have a low bulk density, but would quickly each collapse again. The result would be inhomogeneous beads of high bulk density and low elasticity. The process of the present invention slows the expansion of the pellets in a controlled way to produce homogeneously structured particles that have an uninterrupted skin and a cellular structure on the inside, wherein the cell size is low at the surface and increases toward the center. The size of the cells at the center is less than 250 μm, preferably less than 100 μm. The bulk density of the expanded pellets is typically in the range from 30 g/l to 350 g/l and preferably in the range from 80 g/l to 140 g/l.

Pellet expansion is policed by controlling the pressure and temperature of the temperature-regulated liquid in the pelletizing chamber and also by controlling the temperature of the pelletizing die. When the pellets expand too rapidly and/or in an uncontrolled fashion, meaning that no uninterrupted skin is formed, the pressure of the liquid in the pelletizing chamber is raised and/or the temperature of the temperature-regulated liquid in the pelletizing chamber is lowered. The increased pressure of the temperature-regulated liquid surrounding the pellets counteracts the expanding effect of the physical blowing agent and brakes the expansion of the pellets. Reducing the temperature of the temperature-regulated liquid in the pelletizing chamber brings about a thicker skin on the beads and thus offers more resistance to expansion. When a temperature-regulated liquid is at too high a pressure or too low a temperature relative to the physical blowing agent used, expansion of the pellets can be excessively hindered or even completely stopped, producing pellets where the bulk density is too high. In this case, the pressure of the temperature-regulated liquid in the pelletizing chamber is lowered and/or the temperature of the temperature-regulated liquid is raised.

Expanded pellets are preferably produced from the polymer melts comprising blowing agent when the pressure in the temperature-regulated liquid flowing through the pelletizing chamber is between 0.7 bar and 20 bar. The pressure in the liquid is more preferably between 5 and 15 bar and even more preferably between 10 and 15 bar.

As an addition or alternative to adjusting the pressure and/or the temperature of the temperature-regulated liquid in the pelletizing chamber, the expansion of the pellets can also be influenced through the temperature of the temperature-regulated pelletizing die. Lowering the temperature of the temperature-regulated pelletizing die has the effect of releasing heat from the polymer melt more quickly into the environment. This promotes the formation of an uninterrupted skin, which is a prerequisite for a stable foamed pellet. If the temperature of the temperature-regulated pelletizing die and/or of the liquid in the pelletizing chamber is made too low, the polymer melt will cool down too quickly and solidify before adequate expansion can commence. Expansion of the pellet by the physical blowing agent it contains is so severely impeded as to form pellets having an excessively high bulk density. Therefore, the temperature of the temperature-regulated liquid in the pelletizing chamber and/or the temperature of the temperature-regulated pelletizing die are raised in such a case.

The temperature of the liquid in the pelletizing chamber is preferably between 10° C. and 60° C. in order that the pellets may undergo a controlled expansion in which an uninterrupted foamed skin is formed. The temperature of the liquid is preferably between 25° C. and 45° C. The temperature of the temperature-regulated pelletizing die is preferably between 150° C. and 280° C., more preferably between 220° C. and 260° C. and even more preferably in the range from 245° C. to 255° C.

An excessive temperature on the part of the pelletizing die leads to a thin skin on the surface of the beads and to a later collapsing of the surface. Excessively low temperatures on the part of the pelletizing die reduce the degree of expansion and lead to thick, unfoamed surfaces on the beads.

The pellet material obtained using the process of the present invention preferably has a bead weight in the range from 1 to 40 mg. The density of the expanded thermoplastic elastomer is preferably in the range from 30 to 350 g/l.

In accordance with the present invention the term physical blowing agents describes blowing agents, whose chemical structure remains unchanged during the process of expansion, whose state of aggregation can change during the process of expansion and which are gaseous for the process of expansion. Blowing agents are for example described in Thermoplastic Foam Processing Principles and Development, edited by Richard Gendron, CRC Press, 2005.

The physical blowing agent in one preferred embodiment comprises carbon dioxide, nitrogen or a mixture of carbon dioxide and nitrogen. Any desired mixture of nitrogen and carbon dioxide can be used here. However, it is preferred to use as blowing agent a mixture of carbon dioxide and nitrogen which comprises 50 wt % to 100 wt % carbon dioxide and 0 wt % to 50 wt % nitrogen. Alternatively or additionally, the blowing agent may also comprise an organic blowing agent, for example alkanes, halogenated hydrocarbons or a mixture thereof. Useful alkanes for this include, for example, ethane, propane, butane and pentane. The sole use of $CO_2$ and/or $N_2$ and also their combination as blowing agent without adding further blowing agents is particularly advantageous, since they are inert gases, which are nonflammable, so that no potentially explosive atmospheres can arise in manufacture. This makes cost-intensive safety precautions unnecessary and greatly reduces potential risk in production. It is likewise advantageous that the products do not have to be stored to allow flammable volatiles to gas out before the products are shipped out.

Further advantages arise on additionally adding one or more nucleating agents to the polymer melt comprising a blowing agent. Useful nucleating agents include in particular talc, calcium fluoride, sodium phenylphosphinate, aluminum oxide, carbon black, graphite, pigments and finely divided polytetrafluoroethylene each individually or else in any mixtures. Talc is particularly preferable for use as nucleating agent. The proportion of the overall mass of the thermoplastic molding composition or of the polymer melt which is attributable to the nucleating agent is preferably in the range from 0 to 4 wt % and especially in the range from 0.1 to 2 wt %. The nucleating agent may be added either in the first stage or in the second stage.

The physical blowing agent may be added, for example, via an injection valve using a gas or liquid feed unit depending on the physical state of the physical blowing agent, into the polymer-processing machine.

The thermoplastic elastomer used to make the expanded pellet material is selected for example from thermoplastic polyester elastomers, for example polyetherester or polyesterester, thermoplastic copolyamides, for example polyethercopolyamides, or styrene block copolymers for example styrene butadiene block copolymers. It is particularly preferable for the thermoplastic elastomer to be a thermoplastic polyurethane.

In addition to the monomers and/or oligomers which are reacted to give the thermoplastic elastomer, further starting materials can be added. The mixture of further starting materials can be used to adjust the physical and/or chemical properties of the elastomer. In addition, a catalyst may optionally also be added as a further starting material to catalyze the reaction of the monomers and/or oligomers to give the polymer.

Further additives may be selected for example from nucleating agents, surface-active substances, fillers, flame retardants, for example phosphorus-containing systems, nucleus-forming agents, oxidation stabilizers, additional further stabilizers, for example against hydrolysis, light, heat or discoloration, reinforcing agents and plasticizers, slip and demolding assistants, dyes and pigments and also any desired mixtures thereof. When fillers are used, these may be organic and/or inorganic powders or fibrous materials and also mixtures thereof. The average particle diameter or, in the case of fibrous fillers, the length of the fillers should be in the region of the cell size or less. Preference is given to an average particle diameter or average fiber length in the range from 0.1 to 100 μm, preferably in the range from 1 to 50 μm.

When a thermoplastic polyurethane is used, the thermoplastic polyurethane may be any desired thermoplastic polyurethane known to a person skilled in the art. Thermoplastic polyurethanes and their methods of making have been extensively described, for example in Gerhard W. Becker and Dietrich Braun, Kunststoffhandbuch, volume 7, "Polyurethane", Carl Hanser Verlag, Munich, Vienna, 1993.

In a preferred embodiment, the thermoplastic polyurethane is prepared by reacting a mixture of isocyanates with isocyanate-reactive compounds, preferably having a molecular weight of 0.5 kg/mol to 10 kg/mol as monomers or oligomers, and optionally chain-extending agents, preferably having a molecular weight of 0.05 kg/mol to 0.5 kg/mol. In a further preferred embodiment, the thermoplastic polyurethane is prepared by further adding to the mixture at least one chain transfer agent, a catalyst and optionally at least one filler, auxiliary and/or admixture agent.

The preparation of thermoplastic polyurethane requires at any rate a mixture of isocyanates and isocyanate-reactive compounds. The further addition of chain-extending agents, chain transfer agents, catalysts and filler, auxiliary and/or admixture agents is optional and can take place individually or in all possible variations.

Preferred embodiments utilize aliphatic, cycloaliphatic and/or aromatic isocyanates as organic isocyanates. Particular preference is given to using aromatic, aliphatic and/or cycloaliphatic diisocyanates. Examples of preferred diisocyanates are trimethylene diisocyanate, tetramethylene diisocyanate, pentamethylene diisocyanate, hexamethylene diisocyanate, heptamethylene diisocyanate, octamethylene diisocyanate, 2-methyl-1,5-pentamethylene diisocyanate, 2-ethyl-1,4-butylene diisocyanate, 1,5-pentamethylene diisocyanate, 1,4-butylene diisocyanate, 1-isocyanato-3,3,5-trimethyl-5-isocyanatomethylcyclohexane, 1,4-bis(isocyanatomethyl)cyclohexane, 1,3-bis(isocyanatomethyl)cyclohexane, 1,4-cyclohexane diisocyanate, 1-methyl-2,4-cyclohexane diisocyanate, 1-methyl-2,6-cyclohexane diisocyanate, 2,2'-dicyclohexylmethane diisocyanate, 2,4'-dicyclohexylmethane diisocyanate, 4,4'-dicyclohexylmethane diisocyanate, 2,2'-diphenylmethane diisocyanate, 2,4'-diphenylmethane diisocyanate, 4,4'-diphenylmethane diisocyanate, 1,5-naphthylene diisocyanate, 2,4-tolylene diisocyanate, 2,6-tolylene diisocyanate, diphenylmethane diisocyanate, 3,3'-dimethylbiphenyl diisocyanate, 1,2-diphenylethane diisocyanate and phenylene diisocyanate.

In addition to the isocyanate, the thermoplastic molding composition is constructed of a compound having at least two isocyanate-reactive, hydrogen-containing groups. The isocyanate-reactive hydrogen-containing group is preferably a hydroxyl group. It is particularly preferable for the compound having at least two isocyanate-reactive hydrogen-containing groups to be selected from polyetherol, polyesterol and polycarbonate diol. In this context, polyesterols, polyetherols and/or polycarbonate diols are usually also subsumed under the term "polyols".

The thermoplastic polyurethane is preferably prepared from polyether alcohol. It is particularly preferable to use polyether diol here. Polytetrahydrofuran is a particularly preferred polyether diol. Preference is given to using polyether alcohols, for example polytetrahydrofuran having a molecular weight between 0.6 kg/mol and 2.5 kg/mol. The polyether alcohols are used individually or else as a mixture of various polyether alcohols.

In an alternative embodiment, a polyester alcohol is used to prepare the thermoplastic polyurethane. Polyester diol is used for this in a preferred embodiment. A preferred polyester diol is prepared from adipic acid and 1,4-butanediol. Preferred embodiments of polyester alcohols have a molecular weight between 0.6 kg/mol and 2.5 kg/mol.

In further preferred embodiments, the polyols used for preparing the thermoplastic polyurethane have molecular weights of 0.5 kg/mol to 8 kg/mol, more preferably of 0.6 kg/mol to 6 kg/mol and especially of 0.8 kg/mol to 4 kg/mol. In further preferred embodiments, the polyols have an average functionality of 1.8 to 2.3, more preferably of 1.9 to 2.2 and especially of 2. In a particularly preferred embodiment, the polyol is a polyester alcohol, preferably synthesized from polytetrahydrofuran and has a molecular weight between 0.6 kg/mol and 2.5 kg/mol in a further preferred embodiment.

When the thermoplastic polyurethane is prepared using chain extenders, these are preferably aliphatic, aromatic and/or cycloaliphatic compounds which, in further preferred embodiments, have a molecular weight of 0.05 kg/mol to 0.5 kg/mol. Chain extenders are for example compounds having two functional groups, for example diamines and/or alkanediols having 2 to 10 carbon atoms in the alkylene moiety, especially 1,4-butanediol, 1,6-hexanediol and/or di-, tri-, tetra-, penta-, hexa-, hepta-, octa-, nona- and/or decaalkylene glycols having 3 to 8 carbon atoms and corresponding oligo- and/or polypropylene glycols. Further embodiments for preparing the thermoplastic polyurethane utilize mixtures of chain extenders.

When chain transfer agents are used, these typically have a molecular weight of 0.03 kg/mol to 0.5 kg/mol. Chain transfer agents are compounds that have only one functional group in respect of isocyanates. Examples of chain transfer agents are monofunctional alcohols, monofunctional amines, preferably methylamine and/or monofunctional polyols. Chain transfer agents can be used to specifically control the flow characteristics of mixtures of the individual components. Chain transfer agents in preferred embodiments are used in an amount of 0 part by weight to 5 parts by weight and more preferably in the range from 0.1 part by weight to 1 part by weight, based on 100 parts by weight of the compound having at least two isocyanate-reactive hydrogen-containing groups. Chain transfer agents are used in addition to or instead of chain extenders.

Further embodiments utilize at least one catalyst to prepare thermoplastic polyurethane to catalyze in particular the reaction between the isocyanate groups of the diisocyanates and the isocyanate-reactive compounds, preferably hydroxyl groups, of the compound having at least two isocyanate-reactive hydrogen-containing groups, the chain transfer agents and the chain extenders. In preferred embodiments, the catalyst is selected from the group of tertiary amines, for example triethylamine, dimethylcyclohexylamine, N-methylmorpholine. N,N'-dimethylpiperazine, 2-(dimethylaminoethoxy)ethanol, diazabicyclo(2,2,2)octane and similar substances. In further preferred embodiments, the at least one catalyst is selected from the group of organometallic compounds and is, mentioned by way of example, a titanic ester, an iron compound, for example iron(III) acetylacetonate, a tin compound, for example tin diacetate, tin dioctoate, tin dilaurate or a tin dialkyl salt of an aliphatic carboxylic acid such as dibutyltin diacetate, dibutyltin dilaurate or the like.

Some embodiments utilize the catalysts individually, while other embodiments utilize mixtures of catalysts. The catalyst used in one preferred embodiment is a mixture of catalysts in amounts of 0.0001 wt % to 0.1 wt %, based on the compound having at least two isocyanate-reactive hydrogen-containing groups, preferably the polyhydroxy compound.

Useful auxiliary and/or admixture agents include for example hydrolysis control agents and flame retardants. Further admixture agents and auxiliary agents are discernible from standard reference works such as for example the above-cited Gerhard W. Becker and Dietrich Braun, Kunststoffhandbuch, volume 7 "Polyurethane", Carl Hanser Verlag, Munich, Vienna, 1993.

In addition to catalysts, but also without the use of catalysts, hydrolysis control agents, for example polymers and low molecular weight carbodiimides, can also be added to the isocyanates and the compound having at least two isocyanate-reactive hydrogen-containing groups to prepare the thermoplastic polyurethane.

In a further embodiment, the thermoplastic polyurethane may comprise a phosphorus compound.

To set the Shore hardness of thermoplastic polyurethanes the compounds having at least two isocyanate-reactive hydrogen-containing groups and the chain extenders can be varied within relatively wide molar ratios. In preferred embodiments the molar ratio of compounds having at least two isocyanate-reactive hydrogen-containing groups to total chain extender used is in the range from 10:1 to 1:10, preferably in the range from 5:1 to 1:8 and more preferably in the range from 1:1 to 1:4, the hardness of the thermoplastic polyurethane increasing with increasing chain-extender content. Shore hardnesses are preferably in the range from A44 to D30, more preferably in the range from A62 to A95, most preferably in the range from A62 to A85. Shore hardnesses are determined according to DIN 53505 for compact, i.e., unexpanded, thermoplastic polyurethane.

In further preferred embodiments, the reaction to form the thermoplastic polyurethane is carried out at customary indices. The index is defined as the ratio of the total number of isocyanate groups of the aromatic, aliphatic and/or cycloaliphatic diisocyanate which are used in the reaction to the total number of isocyanate-reactive groups, i.e., the number of active hydrogens in the compound having at least two isocyanate-reactive hydrogen-containing groups and the chain extenders. An index of 100 means that there is one active hydrogen atom, i.e., an isocyanate-reactive function of the compound having at least two isocyanate-reactive hydrogen-containing groups and the chain extenders per isocyanate group of the aromatic, aliphatic and/or cycloaliphatic diisocyanate. Indices above 100 mean that there are more isocyanate groups than there are isocyanate-reactive groups, for example hydroxyl groups.

In particularly preferred embodiments the reaction to form the thermoplastic polyurethane takes place at an index between 60 and 120 and more preferably at an index between 80 and 110.

In addition, the thermoplastic molding composition may optionally comprise at least one additive. The term additive subsumes fillers, auxiliaries and admixtures and also the above-described chain transfer agents, chain extenders and catalysts. The additives can be used in any desired mixtures. The fraction of the overall mass of the thermoplastic molding composition which is attributable to additives is preferably in the range from 0 to 80 wt %.

According to the present invention, the materials used for producing the thermoplastic polyurethane are added to the first stage of the polymer-processing machine. They can be added via a conjoint feed port at the inlet into the polymer processing machine or via two or more feed ports distributed along the length of the polymer-processing machine, in particular the screw-plunger machine. It is preferable to add monomers and/or oligomers and also optionally necessary catalyst first and the further additives for setting the properties of the polymer at a later port, after already at least a portion of the monomers and/or oligomers has reacted to give the polymer.

A twin-screw extruder is an example of a suitable polymer-processing machine for production of expanded pellet material. The length of the twin-screw extruder is chosen such that the region where the monomers and/or oligomers are reacted to give the polymer can be followed by a pressure-establishing region. It is particularly advantageous for this purpose to choose the length such that the pressure can be established along a length of at least 15 L/D, where L/D describes the ratio of length to diameter, upstream of the downstream end of the second stage. At least one restrictive conveying element or kneading element, preferably two to three restrictive conveying elements or kneading elements, can be used to separate the regions of reaction and of pressure establishment from each other. Establishing the pressure downstream of the reaction between the monomers and/or oligomers can be ensured, for example, by the constitution of the screw elements, the process parameters, such as screw speed, and/or the use of a gear pump downstream of the extruder. This creates a pressure in the twin-screw extruder that is not less than 50 bar, preferably from 60 to 100 bar above ambient pressure. It is in the region where this pressure prevails that the physical blowing agent is added, for example via an injection valve using a gas-metering unit. After addition, the mixing elements mix the physical blowing agent homogeneously with the polymer melt along a length of not less than 5 L/D, preferably not less than 10 L/D. To convey the melt comprising the blowing agent, conveying elements may further be provided on at least one screw of the twin-screw extruder.

In one alternative embodiment, the first stage of the polymer-processing machine is followed by a melt channel with the feed port for the physical blowing agent as second stage. In this case, the second stage further comprises a melt pump and a static mixer. The melt channel is, for example, a heatable tube wherethrough the polymer melt flows and into which the physical blowing agent can be imported. An injection valve may likewise be provided for this and a gas-metering unit used to add a blowing agent. The melt pump builds the necessary pressure needed to force the polymer melt comprising the added physical blowing agent through the static mixer and the pelletizing tool. The melt pump may be situated either between the melt channel and the static mixer or alternatively between the first stage and the melt channel. When the melt pump is positioned between the melt channel and the static mixer, it is necessary to configure the first stage such that there is a build-up of pressure in the first stage in the course of the reaction of the monomers and/or oligomers to give the polymer, and further that the pressure is sufficient to also convey the polymer melt through the melt channel. It is further necessary for this to connect the melt channel to the first stage either directly or via a pipework line.

The static mixer is used to distribute the physical blowing agent homogeneously in the polymer melt. The static mixer is preferably heated in order to prevent solidification of the polymer melt, and is constructed for example of mixing elements having a process length of at least 1 L/D, preferably a length of at least 5 L/D, and which are configured such that the residence time of the polymer melt is greater than 0.5 s, preferably greater than 3 s.

The twin-screw extruder or the static mixer is then followed by a suitable system for producing the pellet material, in particular by a pelletizing apparatus.

EXAMPLES

Example 1

At a point 6 L/D from the upstream end of the processing part of a Coperion GmbH ZSK43 twin-screw extruder being used as a reactive extruder to mix and synthesize a thermoplastic polyurethane, 2 mol of 4,4'-diphenylmethane diisocyanate, 1 mol of polytetramethylene glycol having a molar mass of 1000 g/mol, 1 mol of 1,4-butanediol and also 0.2 part by weight of talc nucleating agent and 30 ppm of tin(II) dioctoate catalyst were added, mixed at a temperature between 180 and 220° C. and made to react. The distance of 6 L/D is chosen in order to stop backflowing monomer getting into the drive unit. The backflowing monomer is reentrained by the screw for transportation in the conveying direction.

The reaction mixture is transferred from the reactive extruder into a Coperion GmbH ZSK92 twin-screw extruder being used as main extruder. The feed hopper of the main extruder is situated 6 L/D from the upstream end of the processing part. In the main extruder, the reaction is driven further forward at temperatures in the range from 200 to 240° C. At a point 15 L/D from the downstream end of the main extruder, 0.2 part by weight of nitrogen and 1.5 parts by weight of carbon dioxide being used as the physical blowing agent are injected into the polymer melt using gas-metering stations. A melt pump forces the polymer melt comprising blowing agent through a temperature-regulated pelletizing die at 200° C. into a pelletizing chamber wherethrough a stream of water flows. The holes in the pelletizing die have a diameter of 1.8 mm. A rotating blade in the pelletizing chamber chops the polymer melt at the face of the pelletizing die into pellets having a bead weight of 20 mg. The water, which has a pressure of 10 bar and a temperature of 30° C., exports the pellets from the pelletizing chamber and conveys them into a centrifugal dryer. In the centrifugal dryer, the pellets are segregated from the water and dried. The bulk density of the expanded pellet material thus obtained is 140 g/l.

Example 2

Example 1 was repeated except that the physical blowing agent used was 0.2 part by weight of nitrogen and 2 parts by weight of carbon dioxide. The holes in the pelletizing die had a diameter of 2.4 mm. The water flowing through the pelletizing chamber has a pressure of 5 bar and a temperature of 20° C. The pellets obtained in this way have a bead weight of 32 mg and a bulk density of 120 g/l.

Example 3

Example 1 was repeated except that the physical blowing agent used was 0.3 part by weight of nitrogen and 2.5 parts by weight of carbon dioxide. The main extruder is followed by a melt channel into which the physical blowing agent was injected. The melt channel is followed by the melt pump whereby the polymer melt comprising the physical blowing agent is forced into a temperature-regulated static mixer at 240° C., which is used as dispersing assembly. The static mixer is followed by a pelletizing die which has holes 1 mm in diameter and through which the polymer melt is pressed into the pelletizing chamber. The pellet material thus obtained was adjusted to a bead weight of 5 mg. The water flowing through the pelletizing chamber has a pressure of 20 bar and a temperature of 35° C. The bulk density of the pellet material thus obtained is 100 g/l.

We claim:

1. A process for production of pellets of expanded thermoplastic polyurethane, the pellets having a bulk density in a range from 80 g/l to 140 g/l, said process comprising the steps of:
   (a) adding monomers and/or oligomers used for producing the thermoplastic elastomer with or without further starting materials into a first stage of a polymer-processing machine,
   (b) mixing the monomers and/or oligomers and also the optionally added further starting materials and reacting the monomers and/or oligomers to give a polymer melt in the first stage of the polymer-processing machine,
   (c) immediately or directly passing the polymer melt into a second stage of the polymer-processing machine and adding a physical blowing agent with or without further starting materials to obtain a polymer melt comprising a blowing agent, wherein the blowing agent comprises 50 wt % to 100 wt % carbon dioxide and 0 wt % to 50 wt % nitrogen and no further blowing agent,
   (d) molding the polymer melt comprising a blowing agent into pellets of expanded thermoplastic polyurethane in a system for producing a pellet material which follows the second stage wherein the first stage of the polymer-processing machine and the second stage of the polymer-processing machine are parts of one machine.

2. The process according to claim 1, wherein the polymer-processing machine is a screw-plunger machine.

3. The process according to claim 2, wherein the first stage of the screw-plunger machine and the second stage of the screw-plunger machine are sectors of an extruder.

4. The process according to claim 2, wherein the first stage of the screw-plunger machine is a first extruder of a tandem extruder and the second stage of the screw-plunger machine is a second extruder of the tandem extruder.

5. The process according to claim 2, wherein the second stage of the polymer-processing machine comprises a melt pump, optionally with a melt sieve or a static mixer.

6. The process according to claim 1, wherein the pellet material is obtained by forcing the polymer melt in step (d) through a pelletizing die regulated to a temperature in the range from 150 to 280° C., using a cutting device to cut the polymer melt forced through the temperature-regulated pelletizing die into individual expanding pellets and using a stream of liquid to export the pellets from the pelletizing chamber.

7. The process according to claim 6, wherein a temperature-regulated liquid flowing through the pelletizing chamber as a stream has a temperature in the range from 10 to 60° C. and a pressure in the range from 0.7 to 20 bar above ambient pressure.

8. The process according to claim 1, wherein the expanded pellet material has a bead weight in the range from 1 to 40 mg.

9. The process according to claim 1, wherein the expanded thermoplastic elastomer has an uninterrupted skin.

10. The process according to claim 1, wherein upon the completion of step (c) then step (d) is directly performed.

\* \* \* \* \*